US007617304B2

(12) United States Patent
Devarakonda et al.

(10) Patent No.: US 7,617,304 B2
(45) Date of Patent: Nov. 10, 2009

(54) METHOD, APPARATUS, COMPUTER PROGRAM PRODUCT AND WEB-ENABLED SERVICE PROVIDING DYNAMICALLY ADJUSTABLE POLICIES

(75) Inventors: Murthy V Devarakonda, Peekskill, NY (US); Lorraine M Herger, Port Chester, NY (US)

(73) Assignee: International Business Machines Corporation, Armonk, NY (US)

( * ) Notice: Subject to any disclaimer, the term of this patent is extended or adjusted under 35 U.S.C. 154(b) by 733 days.

(21) Appl. No.: 10/842,601

(22) Filed: May 10, 2004

(65) Prior Publication Data

US 2005/0256947 A1 Nov. 17, 2005

(51) Int. Cl.
*G06F 15/173* (2006.01)
*G06F 15/16* (2006.01)
*G06F 17/00* (2006.01)

(52) U.S. Cl. .................. 709/223; 709/202; 709/217; 707/100

(58) Field of Classification Search ................ 709/223, 709/202, 217
See application file for complete search history.

(56) References Cited

U.S. PATENT DOCUMENTS

| 5,634,072 | A  | * | 5/1997  | Allen et al. ............... 718/104 |
| 6,393,474 | B1 | * | 5/2002  | Eichert et al. ............. 709/223 |
| 7,272,625 | B1 |   | 9/2007  | Hannel et al. ............. 709/200 |
| 7,412,503 | B2 |   | 8/2008  | Chess et al. .............. 709/223 |
| 2001/0019539 | A1 |   | 9/2001  | Kawakami ................ 370/256 |
| 2001/0053694 | A1 |   | 12/2001 | Igarashi et al. ............ 455/433 |
| 2002/0147726 | A1 |   | 10/2002 | Yehia et al. ............... 707/101 |
| 2002/0169858 | A1 | * | 11/2002 | Bellinger et al. ........... 709/220 |
| 2003/0225801 | A1 |   | 12/2003 | Devarakonda et al. ...... 707/205 |
| 2004/0218535 | A1 |   | 11/2004 | Liong et al. ............... 370/238 |
| 2005/0027837 | A1 | * | 2/2005  | Roese et al. ............... 709/223 |
| 2005/0114532 | A1 | * | 5/2005  | Chess et al. ............... 709/230 |
| 2005/0177631 | A1 | * | 8/2005  | Bahl et al. ................. 709/224 |

OTHER PUBLICATIONS

Ludwig et al., "Web Service Level Agreement (WSLA) Language Specification", Version 1.0, Revision: wsla-Jan. 28, 2003, © IBM Corporation, 2001, 2002, 2003.

Ludwig et al., "A Service Level Agreement Language for Dyanmic Electronic Services", Journal of Electronic Commerce Research, vol. 3, No. 1/2, Sep. 2002, pp. 1-23.

Lymberopoulos, et al., "An Adaptive Policy Based Management Framework for Differentiated Services Networks", Proc. 3$^{rd}$ IEEE Workshop on Policies for Distributed Systems and Networks (Policy 2002), Monterey, CA, Jun. 2002, pp. 147-158.

(Continued)

*Primary Examiner*—George C Neurauter, Jr.
*Assistant Examiner*—Mark D Fearer
(74) *Attorney, Agent, or Firm*—Harrington & Smith, PC (57) ABSTRACT

Described is a method, a system, a computer program product and a service implemented at least partially through a data communications network to dynamically change the effect of an enforcement of a policy in a policy-managed system. The method, system, computer program product and service enabling the user to identify at least one policy as a dynamic policy and to specify at least one part of a policy statement of the dynamic policy to have a value that can be varied while the policy is active.

17 Claims, 3 Drawing Sheets

OTHER PUBLICATIONS

Devarakonda et al., "A Policy-Based Storage Management Framework", Proceedings of Policy 2002 Intl. Workshop on Policies for Distributed Systems and Networks, Monterey, CA, Jun. 2002, pp. 1-4.

Dinesh, V., "Policy-Enabled Networking Architecture", New Riders Publishing, 2001, 22 pages.

"Policy Core Information Model (PCIM) Extensions", Network Working Group, RFC #3460, B. Moore, Jan. 2003, 93 pgs.

"Toolkit-Based Approach to Policy-Managed Storage", Devarakonda, Murthy et al., Proc. Of 4th IEEE Intl. Workshop on Policies for Distributed Systems and Networks, Jun. 2003, 4 pages.

"Policy-Based Autonomic Storage Allocation", Devarakonda, Murthy, et al., Proc. Of 14th IFIP/IEEE Intl. Workshop on Distributed Systems: Operations and Management, DSOM 2003, Marcus Brunner and Alexander Keller (Eds.) Published by Springer-Verlag as Lecture Notes on Computer Science 2867, 12 pages.

"Policy-Based Networking: Architecture and Algorithms", Dinesh C. Verma, New Riders publishing, 2001, 21 pages.

"Differentiated Services Quality of Service Policy Information Base", K. Chan et al., ftp://ftp.rfc-editor.org/in-notes/rfc3317.txt, Mar. 2003, 1 pg.

"An Architecture for Differentiated Services", S. Blake et al., Network Working Group, RFC #2475, Dec. 1998, 34 pgs.

"Policy Framework", M. Stevens et al., IETF, Sep. 1999, 31 pgs.

\* cited by examiner

METHOD, APPARATUS, COMPUTER PROGRAM PRODUCT AND WEB-ENABLED SERVICE PROVIDING DYNAMICALLY ADJUSTABLE POLICIES

TECHNICAL FIELD

This invention relates generally to policy-based management systems and methods, and relates further to the fields of computer system management, autonomic computing, digital computer systems, computer systems management, resource management in computer systems, on-demand computing, highly responsive system and policy refinement.

BACKGROUND

There have been significant developments in the area of policy-based computing. The development of policy-based computing is expected to simplify and reduce the cost of system administration, while increasing the quality of service. Policy-based computing allows an administrator to specify a set of rules to guide the operations of a computer system. The techniques of policy-based computing are especially applicable to the area of autonomic computing.

Some examples of policies include a policy that would re-allocate storage and notify the user when specific performance requirements are not met; and a policy that specifies a specific type of service be assigned to a user with specific attributes, e.g. a user associated with a specific company or a specific IP address.

Currently existing efforts in this area include "Policy-Based Networking: Architecture and Algorithms" (New Riders publishing, 2001) by Dinesh C. Verma, which discusses the application of policy-based computing to networking; and "A Framework for Policy-Based Storage Management" by Murthy Devarakonda, Jack Gelb, Avi Saha, and Jimmy Strickland (Proceedings of Policy 2002 Intl. Workshop on Policies for Distributed Systems and Networks, Monterrey, Calif., June 2002), which discusses policy-based storage management. Also, a document available from the Distributed Management Task Force (DMTF), entitled "IETF/DMTF policy framework", http://www.dmtf.org/download/presentations/junedev01/track/0613-01_policy.pdf, represents an attempt to develop standards in policy-based computing.

In the field of on-demand computing, policy management becomes an important element in managing the environment. In order to adaptively respond to changes in resource requirements it should be possible to change policies easily, effectively and rapidly, in response to changing conditions. These changing conditions can be viewed as being generated by, as non-limiting examples, changes in laws, rules or regulations in a particular country; an occurrence of an unforeseen event that can cause a ripple effect throughout a network of computers; or a data center experiencing a rapid up/down surge in requests for processing.

The typical practice in using policies is that policies are created first, and then applied against customer requirements specified in a contract. Once created, the policies are applied with the expectation that the environment can be controlled in meeting the customer requirements. However, if problems are subsequently detected the policies are not readily adaptable or changeable.

The conventional policy specification includes at least a precondition, an action and a priority. When the precondition evaluates to a Boolean value true, the action executed. The priority determines which specific policy action is to be executed if more than one policy having the same precondition, but different actions, evaluates to true.

In general, in conventional practice the policy statements are static, meaning that once they are created and activated, they cannot be changed. If a policy change is required, based on changing business and/or environment conditions, it is necessary to create a new policy reflecting the desired change(s) and to then replace the prior, out-dated policy statement with the newly created policy statement. The replacement operation is generally a two step process of first deactivating the prior policy statement and then activating the new policy statement. However, this can be a cumbersome and time consuming process, especially since the required policy change may be quite small, while the amount of effort needed to create the new policy, verify and activate it may be substantially greater. Further, in a business environment the process of making a change to a policy may involve offline approval and verification steps and, as a result, the policy change may require a significant amount of time to complete. As such, the application of a policy change may not be rapid enough to respond to changes in the external (environmental) conditions (i.e., the policy change process is not a real-time or a substantially real-time process).

Relevant publications include the following: Leonidas Lymberopoulos, Emil Lupu, and Morris Sloman, "An Adaptive Policy Based Management Framework for Differentiated Services Networks," in Proceedings of 3rd IEEE Workshop on Policies for Distributed Systems and Networks (Policy 2002), Monterey, Calif., June 2002, pp 147-158; Heiko Ludwig, Alexander Keller, Asit Dan, Richard King and Richard Frank, "A Service Level Agreement Language for Dynamic Electronic Services," in Journal of Electronic Commerce Research, Vol: 3, No. 1/2, September 2002; "Web Service Level Agreement (WSLA) Language Specification", Version 1.0, Revision: wsla-2003/01/28, Copyright IBM Corporation, 2001, 2002, 2003, also by Heiko Ludwig, Alexander Keller, Asit Dan, Richard King and Richard Frank; and Dinesh C. Verma, "Policy-Based Networking: Architecture and Algorithms," New Riders Publishing, 2001.

Lymberopoulos, et al. describe the adaptation of network routers for changing requirements based on policies. Policies are used to change run-time configuration attributes of a queue manager in network routers and to enable or disable pre-defined queue manager configurations based on some criteria. However, the ability of this prior art technique to change a system (i.e., a system of network routers) is static, and it can accommodate only those conditions which have been anticipated and written into the policies. Furthermore, the changes are made to the system configuration and not to the policies themselves.

Ludwig et al. describe a Service Level Agreement (SLA) language for agreements between a service provider and a customer that allows defining a set of obligations between the parties involved. The agreement also specifies measures to be taken in case of deviation and failure to meet asserted services guarantees, but does not prescribe an implementation policy for a service and its supervision or correction. The SLA language also does not provide a means to change the behavior of a service providing system in response to changing external conditions.

In commonly assigned U.S. patent application Ser. No. 10/719,575, filed Nov. 21, 2003, entitled "Method and Apparatus for the Dynamic Introduction of New Attributes into Policies" David M. Chess, Murthy V. Devarakonda, Alla Segal and Ian N. Whalley describe a system and method that implements a user interface and a policy manager that is coupled to the user interface via a policy repository for introducing a new attribute into a policy for a policy-managed system. This occurs without requiring a change to (e.g., without having to re-write or re-compile) the policy manager.

What is needed is the ability to dynamically adjust active policy statements so that the behavior of an on-line, deployed policy-based system can be modified based on changing conditions.

SUMMARY OF THE PREFERRED EMBODIMENTS

The foregoing and other problems are overcome, and other advantages are realized, in accordance with the presently preferred embodiments of these teachings.

Described herein is a method, a system, a computer program product and a service implemented at least partially through a data communications network that accommodates unanticipated and anticipated external conditions by modifying active policies in a controlled manner. The presently preferred embodiment of this invention provides a mechanism to dynamically adjust a policy so as to influence the behavior of a policy-based system.

Described herein is a method, a system, a computer program product and a service implemented at least partially through a data communications network to dynamically change the effect of an enforcement of a policy in a policy-managed system, the method, system, computer program product and service enabling the user to identify at least one policy as a dynamic policy and to specify at least one part of a policy statement of the dynamic policy to have a value that can be varied while the policy is active.

In a preferred but not limiting embodiment of this invention the policy statement includes a conditional part and an action part such that when the conditional part evaluates to true, the action part is carried out, and further includes a priority part for determining which action to carry out when at least two policy statements exist with the same conditional part, when the conditional part of each such policy evaluates to true, and where at least one of the conditional part, the action part, and the priority part has a value that can be varied when the policy is active.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

For the purposes of this invention a policy-managed system is one where there exists at least one policy comprised of a policy statement, where the policy statement is evaluated during execution of the system (the policy is thus considered to be an active policy), where the result of the evaluation of the policy statement may result in the policy being enforced so as to change in some desired manner the operation of the system.

As was discussed above, it is known in the prior art that a policy can be represented as rules having a conditional part (also known as the precondition) and an action part (also known simply as an action). When the conditional part evaluates to Boolean value true, the action part is carried out. In addition, policies also have a priority assigned to them, which can be used to decide which action to carry out when two or more policies exist with the same conditional part, and when the conditional part of such policies evaluates to true. The conditional part contains assertions about the system, the workload and applications in the scope of the policies. The action part typically contains one or more executable statements that, when executed, achieve some certain intended system behavior. Both conditional assertions and executable statements typically contain parameters, that can include constants, which play a key role in the manner in which policies affect the system. As an example, one may consider the following policies:

Policy P1
If (response_time_for_transaction_class_A<4 milliseconds) then
(increase_transaction_class_A_priority by 5 units)
Policy priority=2100

Policy P2
If (io_stream_throughput_averaged_over_a_day<90% of SLA) then
(schedule_storage_object_reallocation)
Policy priority=1000

Policy P1 states that if the response time for the transaction class A falls below 4 milliseconds in a certain measured period, then the priority for the transaction class should be increased by five units. As can be appreciated, the choice of the constants "4 milliseconds" and "5 units" can play a critical role in the way this exemplary policy affects the operation of the system.

In this invention dynamically adjustable parameters are provided for in the policy statements, and they specially designated (marked-up) as being adjustable. As is shown below, the example policies P1 and P2 are marked-up with dynamically adjustable parameters that are designated as such by being enclosed in two "$" symbols:

Marked-up Policy P1 (MP1):
If
  (response_time_for_transaction_class_A<$response_time$) then
(increase_transaction_class_A_priority by $priority_delta$ units)
Policy priority=$P1_priority_value$ Marked-up Policy P2 (MP2):
If ($performance_metric$<90% of SLA) then
(schedule_storage_object_reallocation)
Policy priority=1000

In accordance with an aspect of this invention the marked-up policies, MP1 and MP2 are dynamically adjustable policies. During system operation some external control, such as a human administrator or management software, such as one known as the Tivoli Intelligent Orchestrator that is available from the assignee of this patent application), can set and change the values of the dynamically adjustable parameters according to external conditions. In MP1, the response_time, priority_delta and P1_priority_value are each a dynamically adjustable parameter. These dynamically adjustable parameters can be set to preferred values (e.g., 10 msec, 5, and 1000, respectively) and can be changed in real time to other values (e.g., 5 msec, 10, and 200). In this manner, and in accordance with this invention, the manner in which policy MP1 affects the system can be changed while the policy remains active. Similarly, in MP2 the performance_metric is a dynamically adjustable parameter, which can be set to a desired and appropriate performance metric. As two non-limiting examples, the variable conditional part parameter performance_metric can be set to io_stream_throughput_averaged_over_a_day when the throughput is deemed important, and can be set to io_stream_response_time_averaged_over_a_day when the response time is deemed more important. It is assumed in these examples that the above mentioned performance metrics are well known, and a part of the SLA of interest. One can readily see that, in these examples, the dynamically adjustable parameters may take on constant values (such as 5 milliseconds), or they may take on other variable names.

Figure 1:
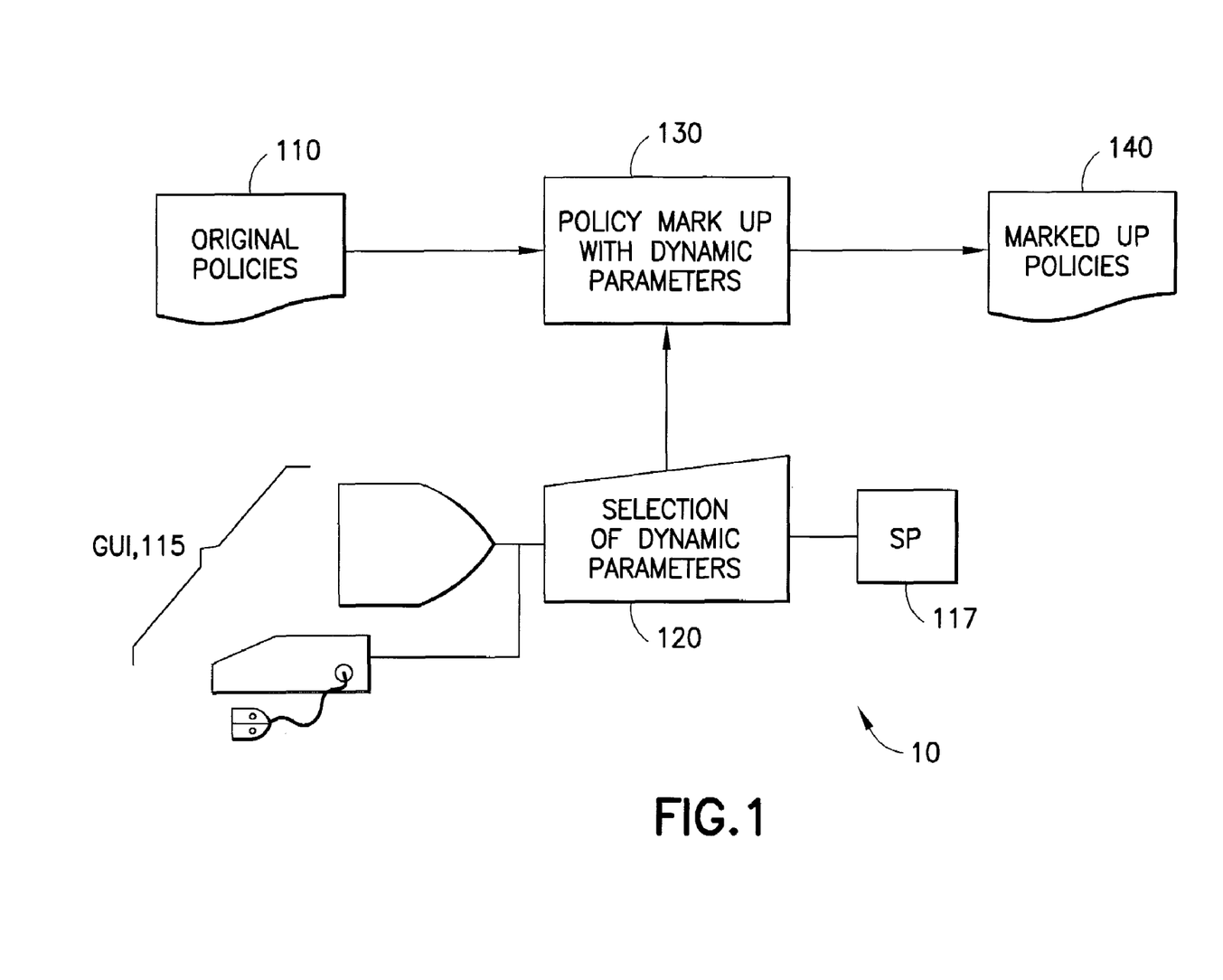
FIG. 1 shows a preferred embodiment of a system and process to mark up policies for dynamic adjustment.

FIG. 1 shows a preferred embodiment of a system 10 and a process to mark-up policies for dynamic adjustment. Thus, FIG. 1 may be viewed as a high level block diagram of a hardware embodiment of the system 10, or it may be viewed as a logical flow diagram of operations performed by one or more suitable programmed data processors under the control of a stored computer program comprised of executable instructions.

Referring to FIG. 1, prior to being marked-up a policy or policies are represented, as an example, in an XML document held in storage 110. A human operator via a suitable user interface (UI), such as a graphical user interface (GUI) 115, or a software package (SP 117) selects policy parameters for marking as dynamically adjustable parameters in block 120. These selected policy parameters are marked-up in block 130 using special delimiter characters, such as a pair of "$", or any suitable character pairs. The mark-up process results in policies with dynamically adjustable parameters which can be stored at 140 in a second XML document (or in any suitable format).

It is understood that those skilled in art may use other mechanisms for marking dynamically adjustable parameters, and various pre-existing or newly developed policy creation tools may be enhanced to incorporate the policy selection and mark-up capability in accordance with this invention. The end result is that a policy, such as the policies P1 and P2, are marked-up so as to contain at least one variable, and to thus provide the policies MP1 and MP2, respectively.

Figure 2:
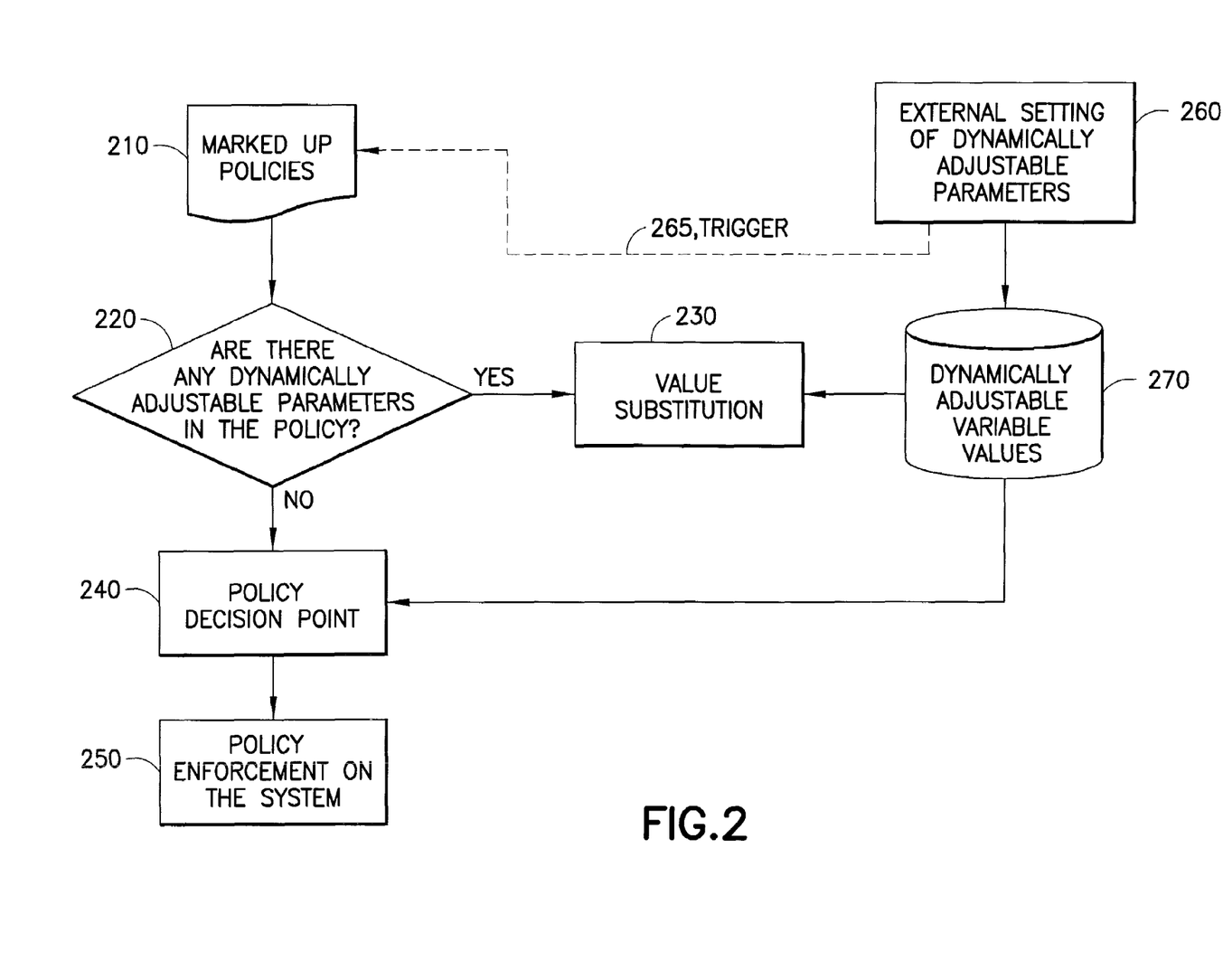
FIG. 2 shows preferred embodiment of a method, as a flow chart, for dynamically adjusting policies that are marked up for dynamic adjustment.

FIG. 2 shows preferred embodiment of the method, as a flow chart, for dynamically adjusting policies that are marked-up for dynamic adjustment. However, and as was the case for FIG. 1, FIG. 2 may also be viewed as a high level block diagram of a hardware embodiment, or it may be viewed as a logical flow diagram of operations performed by one or more suitable programmed data processors under the control of a stored computer program comprised of executable instructions.

In FIG. 2 a marked-up policy may be in an XML document 210, obtained from the storage 140 of FIG. 1, and when activated is executed as described herein. Each policy is examined at block 220 to determine if any policy parameters are marked-up (e.g., such as by testing for the presence of a pair of delimiter characters "$" having one or more intervening alphanumeric characters), and if so current values for the marked-up parameter(s) are obtained from storage 270, and substituted in the marked-up policy in value substitution block 230. After the operation of the value substitution block 230, or if the policy was determined not to be a marked-up policy at block 220, policy execution continues at step 240. The policy decision point block 240 can be one that is consistent with conventional policy execution methods and apparatus, such as the one described by Dinesh C. Verma in the above-noted "Policy-Based Networking: Architecture and Algorithms" (New Riders publishing, 2001).

However, in accordance with this aspect of the invention the policy decision block 240 operates to evaluate the conditional part of policies in policy priority order and, if it results of the evaluations are Boolean true, then the action part of the policy is executed or enforced in policy enforcement block 250. The operation of the policy enforcement block 250 may also be consistent with and as described by Dinesh C. Verma in "Policy-Based Networking: Architecture and Algorithms". The operation of the policy enforcement block 250 affects the system behavior as per the policies and as per the current settings of the dynamically adjustable parameters.

Further in accordance with this invention, based on anticipated or unanticipated changes in the external environment of the policy-managed system a human administrator can change the values for the dynamically adjustable parameters using block 260, which may be interfaced to the GUI 115 of FIG. 1, or which may comprise a separate user interface. The resultant dynamically adjustable policy variable values may then be saved in storage 270, and subsequently used as described above. However, instead of or in addition to human administrators, computerized automation may be used to set the values of the dynamically adjustable parameters in block 260. In any case, whether purely human control is used, or purely computerized (algorithmic) control is used, or whether a combination of human and algorithmic control is used, because the values for the dynamically adjustable parameters are substituted prior to evaluating policies, this invention allows real time modification to policies to meet on demand responsive requirements of the system. Furthermore, dynamic adjustments to policies are not statically prescribed, and therefore changes in the system behavior are not predefined, which allows for maximum flexibility. By also providing for additional steps and processes, such as consistency, validation, conflict and coverage checking (e.g., as described by Dinesh C. Verma in "Policy-Based Networking: Architecture and Algorithms" (New Riders publishing, 2001) between steps 230 and 240, various policy analysis techniques may be applied to the dynamically adjustable policies with a consequent realization of the additional benefits.

It is assumed in FIG. 2 during operation of the policy-managed system that the set of policies are periodically processed by the blocks 210, 220, 230, 240 and 250 so that any changes to the variable parameter values made by block 260 and stored in block 270 will be acted upon. Depending on the nature of the system the periodicity of the policy testing and enforcement may vary from seconds to minutes or longer. However, it is within the scope of this invention to provide for an output of the block 260, shown as the dashed line 265, to trigger the operation of the blocks 210, 220, 230, 240 and 250 so that a change to a variable parameter(s) of a policy can be acted upon immediately, thereby providing for real-time or substantially real-time control of the policy-managed system.

Figure 3:
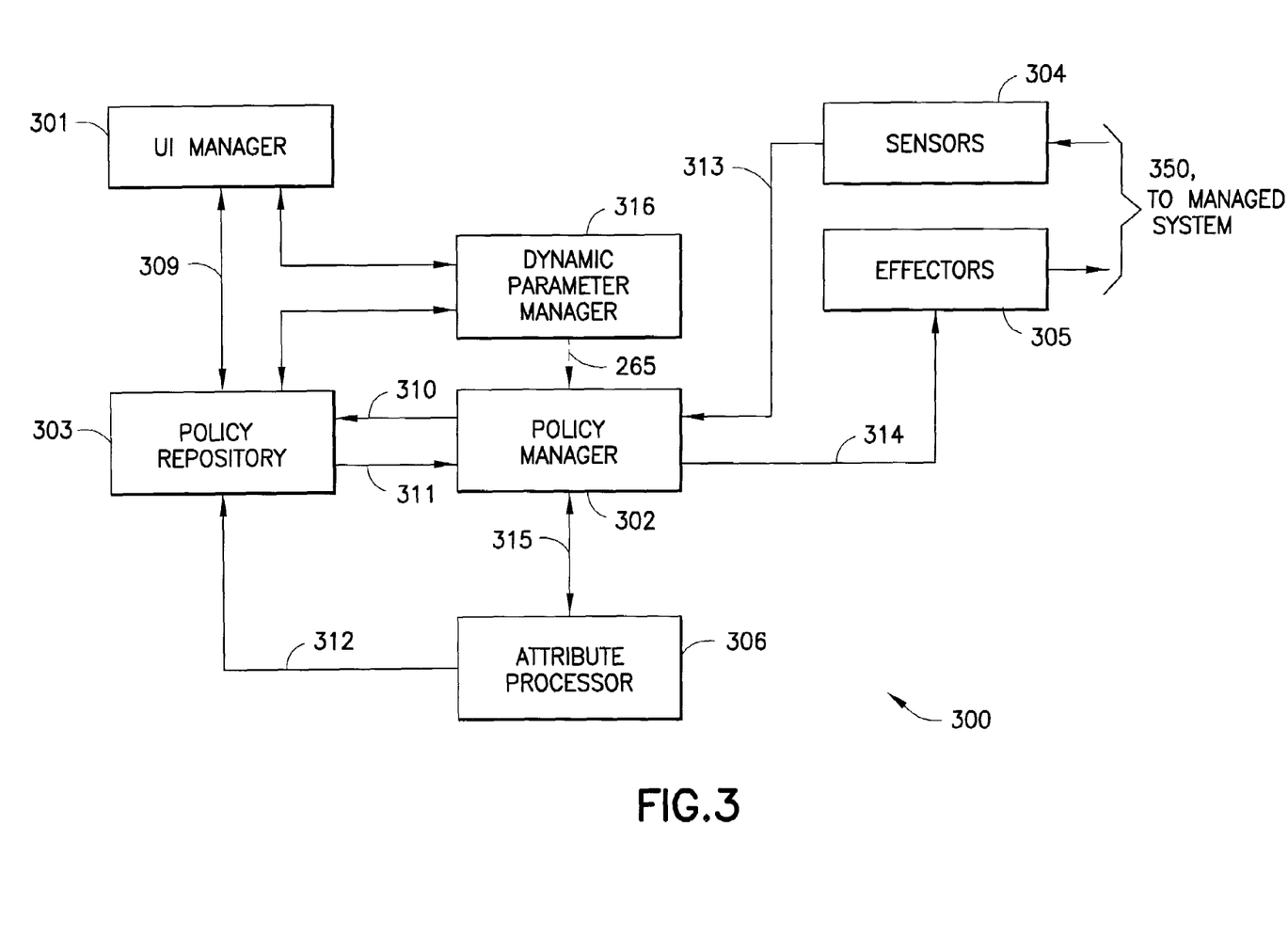
FIG. 3 is a simplified block diagram of a system that is suitable for practicing this invention, and that includes a user interface, a policy manager, a policy repository, sensors and effectors and a policy dynamic parameter manager.

FIG. 3 shows a computer system, specifically a policy management system 300 that is constructed and operated in accordance with a presently preferred embodiment of this invention. The policy management system 300 includes a user interface manager 301 that is assumed to incorporate a user interface (UI) component having a user input device(s), such as a keyboard, a pointing device, and/or a voice recognizer, as well as a user output device(s), such as a display screen and/or a voice synthesizer. The UI manager 301 may be coupled during use to the GUI 115 shown in FIG. 1. The policy management system 300 further includes a policy engine or manager 302, a policy repository 303, sensors 304 and effectors 305 coupled to a policy-managed system 350. The policy-managed system 350 could be, as non-limiting examples, one of a data storage system, a database system, a random machine such as a web server, and a CPU.

Also shown, in accordance with this invention, is a dynamic parameter manager 316 that at least performs the functions of the blocks 120, 130 and 140 of FIG. 1, as well as the function of the block 260 of FIG. 2. As such, the dynamic parameters manager 316 is shown coupled to the UI manager 301 (assuming that human interactivity is employed in the selection and setting of the dynamic parameters), as well as to the policy manager 302 via the optional trigger line 265 that was shown in FIG. 2. The policy manager 302 is assumed to perform the functions of the blocks 210, 220, 230, 240 and 250 so that a change to a variable parameter(s) of a policy can be acted upon. The above-mentioned consistency, validation, conflict and coverage checking functions for the dynamic policies may be performed by the dynamic parameter manager 316 during dynamic priority specification, or less preferably these functions could be performed in whole or in part by the policy manager 302.

In general, the sensors 304 can be classified as dynamic sensors or as static sensors. For the example of a data storage system as the policy-managed system 350 the dynamic sensor (s) can return real-time or substantially real-time information that is descriptive of, as examples, response time, throughput, capacity and demand. Static sensors provide other types of information, such as the size of the storage system, system model number, historical error logs, and so forth. The effectors 305 in this example may be any type of mechanism that can be used to perform some type of physical allocation. For example, in a RAID-type data storage system the effector(s) 305 may be used to change the striping of the RAID-array.

Policies may be provided to the system 300 via the user interface 301 and stored in the policy repository 303, via bus 309. Policies, both conventional policies and those that include variable parameter values in accordance with this invention, are read out from the policy repository 303 over bus 311 for processing by the policy manager 302, and may be returned via bus 310. The dynamically adjustable policy variable value(s) for the one or more dynamically variable policy statements may also be stored in the policy repository 303, which may then include the storage block 270 shown in FIG. 2. The metrics that can be used in the policies are measured and provided, via bus 313, by the sensors 304 based on properties of the policy-managed system 350. As was noted above, the policy-managed system 350 could be, as a non-limiting example, a data storage system, and some typical metrics that may be measured and that may be of interest to the SLA include the read_transfer_rate and the write_transfer_rate. Once the policy or policies have been evaluated, the results of policy evaluation are carried out on the policy-managed system 350 by the effectors 305, via bus 314 from the policy manager 302.

In general, the sensors 304 can provide information about all available metrics to the policy manager 302 via the bus 313. This can be accomplished in various ways, depending on the design of the specific sensors 304. For example, if the sensors 304 are designed to obtain the value of only a specific metric on request, then the sensors 304 may support a request to return a list of all available metrics. In another example, the output from the sensors 304 contains all available metrics (e.g., storage system sensors may use system-level system commands and provide all discovered values in response).

In the preferred embodiment of this invention the policy or policies having one or more dynamic parameter values are stored in the policy repository 303, under control of the dynamic parameter manager 316, and are acted upon and enforced by the policy manager 302, as discussed above, to provide dynamic policy adjustment for the policy-managed system 350.

Based on the foregoing it can be appreciated that this invention provides a method, a system and a computer program product to adjust one or more policies dynamically in an on-line environment, where it is desired to adjust active policies in order for the on-demand environment to behave differently under changing global and/or local conditions. The need for the change in the system behavior may be anticipated or it may be unanticipated at the time when the policies are first created and activated. To meet and adjust to changing conditions this invention provides for dynamic policy adjustment. In this invention a policy statement contains at least one parameter denoted as a dynamically adjustable parameter, whose value can be changed, in real time or substantially real time, while the policy is in effect. The adjustable parameters permit a controller to adjust and tune the policy, change priorities, or otherwise modify the policy based on changing conditions.

In the preferred embodiment of this invention there is provided a logical mechanism to mark certain parameters as dynamically adjustable in the precondition and action parts of a policy. Optionally, the priority of a policy may also be marked as being dynamically adjustable, either alone or in combination with adjustable precondition and/or action parts of the policy. The use of this invention enhances the conventional policy execution environment by providing an ability to substitute current values for the dynamically adjustable parameter values before evaluating the policy, and before the action part is executed if the condition evaluates to true. A control, such as a human administrator or an autonomic manager software system, can set specific values for the dynamically adjustable parameters at any time, thus dynamically adjust policies for the policy-managed system, which in turn dynamically changes the behavior of the system.

The policies may be viewed as a set dynamically adjustable controls, which can be modified, turned on and off, prioritized, weighted in importance and otherwise adjusted for in an on-line, deployed environment based on changing global and/or local conditions. Dynamic parameters are specified and their values defined, and the parameters can be changed based on how well certain goals are met as a result of corresponding policy enforcement and resulting actions. The values of dynamic parameters can be changed to control the impact of the policy specification in achieving a goal related to the policy-managed system. A given policy may be turned on or off, such as by adjusting a value of a certain tested parameter to either be within or outside of a range of expected measured values. Policy actions may be weighted, and the weights changed as well during operation of the policy managed system.

Based on the foregoing description it can be appreciated that an aspect of this invention is a computer program that is embodied on a computer readable medium, such as disk, tape and/or semiconductor memory, that is executed by at least one data processor of the policy management system 10 or 300. A further aspect of this invention is a computer readable storing medium embodied with a computer program of machine-readable instructions executable by a digital processing apparatus to perform operations to implement a dynamic policy adjustment, where the operations include defining a policy statement that contains at least one parameter denoted as a dynamically adjustable parameter whose value can be changed, in real time or substantially real time, while the policy is in effect, and adjusting and tuning the policy, changing priorities, or otherwise modifying the policy to possibly accommodate changing environment and system conditions.

It should further be appreciated that a further aspect of this invention can implement a service that is provided over a data communications network, such as the Internet, to enable a user of the service to dynamically change the effect of an enforcement of a policy in a policy-managed system. The service in this embodiment enables the user to identify at least one policy as a dynamic policy, and to specify at least one part of a policy statement of the dynamic policy to have a value that can be varied while the policy is active. As such, it can be appreciated that the link between the GUI 115 and the selection of dynamic parameters block 120 in FIG. 1, and/or the link between the external setting block 260 and the block 270 of FIG. 2, can be made at least partially through a data communication network that can comprise a local area network e.g., a LAN or Wireless LAN, and/or a global area network, such as the Internet. Thus, an aspect of this invention is provision of Web-enabled service as part of, or otherwise in conjunction with, a Service Level Agreement (SLA).

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. As but some examples, the use of other similar or equivalent parameters and techniques for specifying variable policy parameters, including priorities, may be attempted by those skilled in the art. However, all such and similar modifications of the teachings of this invention will still fall within the scope of this invention.

Furthermore, some of the features of the present invention could be used to advantage without the corresponding use of other features. As such, the foregoing description should be considered as merely illustrative of the principles of the present invention, and not in limitation thereof.

What is claimed is:

1. A method, comprising:
   identifying, at a processor, at least one policy as a dynamic policy;
   specifying, by the processor, at least one part of a policy statement of the dynamic policy to have a value that can be varied while the policy is active;
   providing the policy statement to comprise a conditional part and an action part that is carried out when the conditional part evaluates to true and a priority part for determining which action to carry out when at least two policy statements exist with the same conditional part and when the conditional part of each of the at least two policy statements evaluates to true, where the specifying comprises delimiting at least one of the conditional part, action part and priority part using a predetermined delimiter;
   varying a value of at least one of the conditional part, the action part, and the priority part when the policy is active, where the value is variable; and
   during operation of the policy-managed system, determining if the policy statement comprises the predetermined delimiter, and if so, retrieving a current value of any delimited conditional part, action part and priority part prior to evaluating the policy statement to determine if the conditional part is currently true and operating at least one sensor coupled to the policy-managed system to use system-level system commands and to discover a value of at least one metric of the service level agreement of the policy managed system, and comparing an output of the at least one sensor to the value of the conditional part of a policy statement being evaluated by the processor to determine if the conditional part is currently true; and if the conditional part is determined to be true, performing a corresponding action through an effector.

2. A method as in claim 1, further comprising providing the policy statement so as to comprise a conditional part and an action part such that when the conditional part evaluates to true, the action part is carried out, and further comprising varying a value of at least one of the conditional part and the action part when the policy is active.

3. A method as in claim 2, where the value is varied by operation of the processor.

4. A method as in claim 1, wherein the sensor is a dynamic sensor.

5. A method as in claim 1, wherein the sensor is a static sensor.

6. A computer readable storing medium comprising a computer program product comprising instructions that, when executed, cause a processor to:
   identify at least one policy as a dynamic policy;
   specify at least one part of a policy statement of the dynamic policy to have a value that can be varied while the policy is active;
   provide the policy statement to comprise a conditional part and an action part that is carried out when the conditional part evaluates to true and a priority part for determining which action to carry out when at least two policy statements exist with the same conditional part and when the conditional part of each of the at least two policy statements evaluates to true, where the specifying comprises delimiting at least one of the conditional part, action part and priority part using a predetermined delimiter;
   vary a value of at least one of the conditional part, the action part, and the priority part when the policy is active, where the value is varied by operation of the computer program; and
   during operation of the policy-managed system, determine if the policy statement comprises the predetermined delimiter, and if so, retrieve a current value of any delimited conditional part, action part and priority part prior to evaluating the policy statement to determine if the conditional part is currently true and operate at least one sensor coupled to the policy-managed system to use system-level system commands and discover a value of at least one metric of the service level agreement of the policy-managed system, and compare an output of the at least one sensor to the value of the conditional part of a policy statement being evaluated to determine if the conditional part is currently true; and, if the conditional part is determined to be true, perform an action through an effector.

7. A computer readable storing medium as in claim 6, wherein the instructions that, when executed, cause a processor to provide the policy statement so as to comprise a conditional part and an action part such that when the conditional part evaluates to true, the action part is carried out, and vary a value of at least one of the conditional part and the action part when the policy is active.

8. A computer readable storing medium as in clam 7, where the value is varied by operation of the processor.

9. A computer readable storing medium as in claim 6, wherein the sensor is a dynamic sensor.

10. A computer readable storing medium as in claim 6, wherein the sensor is a static sensor.

11. An apparatus, comprising:
- a unit to identify at least one policy as a dynamic policy; and
- a unit to specify at least one part of a policy statement of the dynamic policy to have a value that can be varied while the policy is active, where the policy statement comprises a conditional part and an action part such that when the conditional part evaluates to true, the action part is carried out, and further comprises a priority part for determining which action to carry out when at least two policy statements exist with the same conditional part, when the conditional part of each such policy evaluates to true, and where at least one of the conditional part, the action part, and the priority part has a value that can be varied when the policy is active, where said unit to specify further comprises a unit to delimit at least one of the conditional part, action part and priority part using a predetermined delimiter;
- a unit, responsive to the policy being active, to determine if the policy statement comprises the predetermined delimiter and, if so, to retrieve a current value of any delimited conditional part, action part and priority part prior to evaluating the policy statement to determine if the conditional part is currently true; and
- at least one sensor coupled to a to use system-level system commands and to discover a value of at least one metric of the service level agreement of the policy managed system, and where said unit to determine operates to compare an output of the at least one sensor to the value of the conditional part of a policy statement being evaluated to determine of the conditional part is currently true.

12. An apparatus as in claim 11, wherein the policy statement comprises a conditional part and an action part such that when the conditional part evaluates to true, the action part is carried out, and further comprising varying a value of at least one of the conditional part and the action part when the policy is active.

13. An apparatus as in claim 12, where the value is varied by operation of a human administrator via a user interface.

14. An apparatus as in claim 11, wherein the sensor is a dynamic sensor.

15. An apparatus as in claim 11, wherein the sensor is a static sensor.

16. An apparatus as in claim 11, wherein if the conditional part is determined to be true, the action part corresponding to the conditional part is performed by at least one effector.

17. An apparatus as in claim 16, wherein the at least one effector performs a physical allocation.

* * * * *

UNITED STATES PATENT AND TRADEMARK OFFICE
CERTIFICATE OF CORRECTION

PATENT NO. : 7,617,304 B2
APPLICATION NO. : 10/842601
DATED : November 10, 2009
INVENTOR(S) : Devarakonda et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1064 days.

Signed and Sealed this

Fourteenth Day of December, 2010

David J. Kappos
*Director of the United States Patent and Trademark Office*